United States Patent [19]

Huey et al.

[11] Patent Number: 4,622,054
[45] Date of Patent: Nov. 11, 1986

[54] METHOD AND APPARATUS FOR MAKING NON-CIRCULAR MINERAL FIBERS

[75] Inventors: Larry J. Huey; Paul D. Beuther, both of Granville, Ohio

[73] Assignee: Owens-Corning Fiberglas Corporation, Toledo, Ohio

[21] Appl. No.: 829,673

[22] Filed: Feb. 14, 1986

Related U.S. Application Data

[63] Continuation-in-part of Ser. No. 677,666, Dec. 3, 1984, abandoned.

[51] Int. Cl.$^4$ ............................................. C03B 37/022
[52] U.S. Cl. .................................................. 65/2; 65/1; 65/8; 65/12; 65/16; 264/177.2; 425/76; 425/463; 428/399
[58] Field of Search ............... 65/1, 2, 8, 12, 16; 264/177 F; 425/76, 463; 428/399

[56] References Cited

U.S. PATENT DOCUMENTS

| | | |
|---|---|---|
| 2,294,266 | 8/1942 | Barnard ................................. 65/1 |
| 2,453,864 | 11/1948 | Schlehr ............................. 65/12 X |
| 2,465,283 | 3/1949 | Schlehr ............................. 65/12 X |
| 2,578,986 | 12/1951 | Schoonenberg et al. . |
| 2,908,036 | 10/1959 | Russell ................................. 65/12 |
| 3,063,094 | 11/1962 | Warthen . |
| 3,268,313 | 8/1966 | Burgman et al. ..................... 65/2 X |
| 3,425,454 | 2/1969 | Eakins et al. ......................... 65/2 X |
| 3,600,491 | 8/1971 | Shimoda et al. ................. 264/177 F |
| 3,607,185 | 9/1971 | Andrysiak ............................ 65/1 X |
| 3,623,939 | 11/1971 | Ono et al. ..................... 264/177 F X |
| 3,650,716 | 3/1972 | Brossard . |
| 3,775,074 | 11/1973 | Russell ................................. 65/8 X |
| 3,912,478 | 10/1975 | Presby . |
| 3,914,488 | 10/1975 | Gorrafa ....................... 264/177 F X |
| 4,001,369 | 1/1977 | Shah .............................. 264/177 F X |
| 4,028,081 | 6/1977 | Marcatili . |
| 4,038,062 | 7/1977 | Presby . |
| 4,050,915 | 9/1977 | Brown . |
| 4,091,065 | 5/1978 | Shah ................................ 264/177 F |
| 4,144,044 | 3/1979 | Russell . |
| 4,307,478 | 12/1981 | Ward et al. ..................... 428/399 X |
| 4,316,924 | 2/1982 | Minemura et al. ............. 428/399 X |
| 4,329,163 | 5/1982 | Russell ............................... 65/12 X |
| 4,349,364 | 9/1982 | Morrison . |
| 4,362,541 | 12/1982 | Thompson ........................ 65/12 X |
| 4,376,746 | 3/1983 | Ward et al. ................. 264/177 F X |
| 4,385,916 | 5/1983 | Jochem et al. . |
| 4,391,618 | 7/1983 | Lecron . |
| 4,398,933 | 8/1983 | Lecron . |
| 4,401,451 | 8/1983 | Lecron . |
| 4,437,869 | 2/1984 | Lecron . |
| 4,469,499 | 9/1984 | Lecron . |

FOREIGN PATENT DOCUMENTS 835428 12/1938 France ................................... 65/12

OTHER PUBLICATIONS

"Cooling of a Free Jet with Variable Viscosity", paper #68-FF-19, Transactions of the ASME, Glicksman, 10/1968.

*Primary Examiner*—Robert Lindsay
*Attorney, Agent, or Firm*—Ronald C. Hudgens; Greg Dziegielewski; Ted C. Gillespie

[57] ABSTRACT

A method and apparatus for making non-circular mineral fibers, and the fibers produced thereby, comprises flowing a stream from a body of molten mineral material through a non-circular orifice, and quenching the mineral material in the stream to form a mineral fiber having a non-circular cross-section.

9 Claims, 11 Drawing Figures

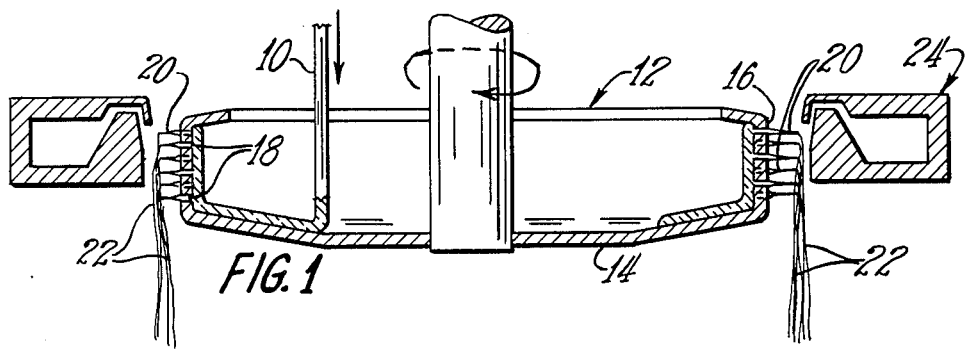
FIG. 1
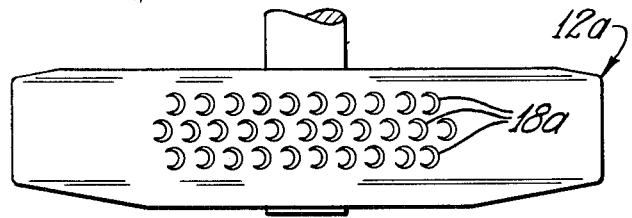
FIG. 2
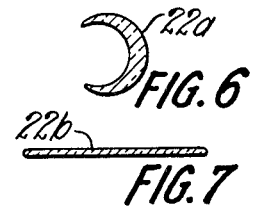
FIG. 6
FIG. 7
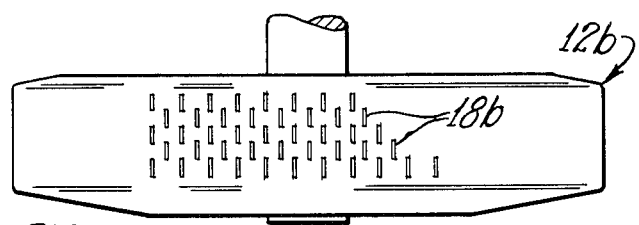
FIG. 3
FIG. 8
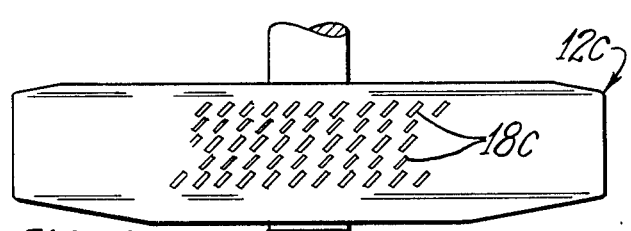
FIG. 4
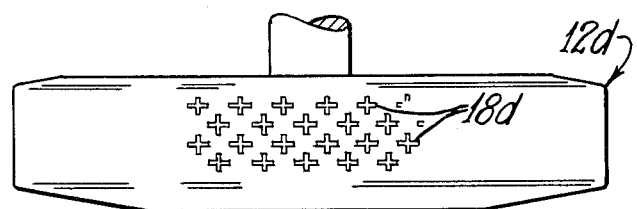
FIG. 5

METHOD AND APPARATUS FOR MAKING NON-CIRCULAR MINERAL FIBERS

This is a continuation-in-part of Ser. No. 677,666 filed Dec. 3, 1984 now abandoned.

TECHNICAL FIELD

This invention pertains to mineral fibers and the manufacture of mineral fibers for such uses as textiles, reinforcements, construction materials, and insulating materials. With respect to this invention, mineral fibers means fibers of glass, rock, slag or basalt. In one of its more specific aspects, this invention pertains to non-circular mineral fibers and, in particular, non-circular glass fibers.

BACKGROUND OF THE INVENTION

The production of wool glass fibers by means of the rotary process is well known. In general, molten glass is fed into a spinner which revolves at high speeds. The spinner has a peripheral wall containing a multiplicity of orifices. Molten glass passed by centrifugal force through the orifices of the peripheral wall forms small diameter molten glass streams. Positioned circumferentially about the spinner is an annular blower for turning the fibers downwardly and, in some cases, for further or secondary attenuation of the original or primary fibers to produce fibers of smaller diameter. As the streams of molten glass are emitted from the orifices, they are still sufficiently nonviscous that surface tension forces pull or shape each of the molten streams into substantially circular cross-sections, regardless of the cross-sectional shape of the streams as they are emitted from the orifices. Further, rotary fiberizers are typically equipped with annular burners or other sources of hot gases for secondary attenuation of the primary fibers; these hot gases keep the glass sufficiently fluid or nonviscous that fibers of substantially circular cross-section result.

The production of textile or continuous glass fibers by mechanically drawing molten streams of glass from orifices in the bottom wall of a bushing or feeder is also well known. Non-uniformities in the roundness of the molten streams tend to be corrected by surface tension forces prior to the cooling and hardening of the molten streams into glass fibers. Thus, as in the case of wool glass fiber production, it has not been possible to produce significantly non-circular continuous fibers using shaped orifices in a bushing.

There has long been a need for producing fibers, both in the rotary process and in the continuous fiber process, that have significantly non-circular cross-sections. With respect to reinforcement of resin matrices, such non-circular fibers would be useful in imparting greatly increased transverse strength and improved shear strength qualities. Non-circular fibers for use as insulation materials would be advantageous in that the increase surface area per unit volume of glass would lower the thermal conductivity of insulation made from such fibers.

A measure of the non-circularity of mineral fibers is the "mod ratio", which is defined as the ratio of the diameter of the smallest circle into which the fiber cross-section fits to the diameter of the largest circle which can fit inside the fiber cross-section. As employed herein, fibers having a mod ratio or less than 1.2 are referred to as circular fibers; fibers having a mod ratio greater than or equal to 1.2 are referred to as non-circular fibers.

One attempt to make non-circular glass fibers was by Warthen, as described in U.S. Pat. No. 3,063,094. Warthen's method employs mechanical perturbation of the glass stream while it is still in a plastic, deformable state. Warthen teaches that to create a non-circular fiber, the glass stream, initially in a conical shape with a circular cross-section, should be distorted at a region where the viscosity of the stream is sufficiently high as to become rapidly chilled or solidified during attenuation of the streams to a continuous fiber whereby a similar distortion in the cross-sectional configuration is retained in the attenuated solidified fiber. Warthen also teaches that a heat sink is to be applied to the glass stream by direct contact. This raises the viscosity of the molten glass to better enable retention and perpetuation of the non-circular cross-sectional character of the mechanically perturbed molten glass stream.

Other attempts at producing non-circular fibers have been shown in the art. Processes are known for modifying round glass fibers in order to produce optical fiber wave guides of a non-circular shape. In some cases, a double crucible method is employed for making an optical fiber in which the inner fiber core has a non-circular cross-section. It is also known in the art of making glass fibers to use a mechanical stirrer positioned with the fiber forming cone to produce a twisted or distorted fiber.

In the art of producing organic fibers, it is a common practice to use quenching methods to solidify molten streams of organic material into non-circular cross-sections which are similar to the shapes of the non-circular orifices. However, these methods are practical under conditions which differ greatly from conditions associated with forming mineral fibers. The production of organic non-circular fibers can be facilitated by pressurization of the bushings, whereas pressurization of bushings containing molten glass presents severe operating problems. The melting points of glass and organic compositions differ by 1500° F. (815° C.) or more. The mineral material of this invention will have a liquidus temperature greater than about 1200° F. (649° C.), whereas organic compositions soften and/or decompose at much lower temperatures.

The differences in physical characteristics can be clearly understood by comparing the ratio of viscosity-to-surface tension for glass with the same ratio for organic fiber forming material. The viscosity-to-surface tension ratio (poises/(dynes/cm)) of polymers lies within the range of from about 25 to about 5000. The ratio for glass is within the range of from about 0.1 to about 25, preferably within the range of from about 0.25 to about 15, and most preferably within the range of from about 0.4 to about 10. The viscosity of molten glass at fiber-forming temperatures is typically about 300 poises whereas the viscosity of the molten organic material is typically on the order of about 1000 to about 3000 poises. Also, the surface tension forces of glass (on the order of about 250 to about 300 dynes/cm) are an order of magnitude greater than those of the organic material (about 30 dynes/cm). The lower viscosity and higher surface tension of glass make it about 100 times more difficult to prevent the shaped glass fibers from re-forming into glass fibers having circular cross-sections.

In spite of past attempts to manufacture non-circular mineral fibers, there has never been a commercially successful method or apparatus for achieving the goal of making non-circular fibers from non-circular orifices.

STATEMENT OF THE INVENTION

It has now been found that mineral fibers, such as glass fibers, can be produced with non-circular cross-sections by discharging streams of molten mineral material from non-circular orifices and forceably quenching the streams sufficiently fast to hard them into non-circular mineral fibers. This forceable cooling of the streams hardens them into fibers with non-circular cross-sections before surface tension forces can cause the streams to assume circular cross-sections. The rapid cooling aspect of this invention enables the production of mineral fibers having higher mod ratios than those practically feasible with the processes of the prior art. The invention can be employed in both the rotary process and in a continuous fiber process. When used with the rotary process, the invention must be accompanied by the absence of external heating means, or at least a substantial reduction in heat from heat sources external of the spinner, such as annular burners, combustion chambers and induction heaters.

Although the preferable means for quickly quenching the streams is a relatively cold (e.g., room temperature) gaseous flow, such as air, directed into contact with the streams, any suitable means for rapidly cooling the streams, such as fluid flow, water spray, liquid bath, ultrasonics or fin shields, can be employed. Streams having greater mod ratios will, in general, have greater surface areas (i.e., greater perimeter of the stream cross-section) and hence greater heat transfer characteristics (and quench rates) than those streams with lesser mod ratios. When using a cooling gas, the temperature and velocity of the cooling gas flow also affects the quench rate, as does the velocity of the streams and the time required for passage of the streams through the quenching gas flow as well as the distance traveled before the streams are hardened into fibers.

The mineral fiber forming process of this invention can be affected by numerous variables, including inertia forces (hydrostatic head or pressurization in a textile process; hydrostatic head forces in a rotary process), body forces in a rotary process, initial temperature and viscosity of the mineral material, thickness or depth of the non-circular orifice, surface tension characteristics of the molten mineral material, speed at which the streams are traveling, and the rate at which the streams are quenched.

Pressurization of the body of molten glass, or the inertial force on the glass from the spinner, or the mechanical pulling force in a continuous fiber process, can affect the ultimate mod ratio of the mineral fibers. To the extent that surface tension forces start to act to re-form the streams into circular cross-sections before the streams reach the cooling gas flow, the source of which may be positioned some distance below the non-circular orifices, the time for the streams to reach the region of the cooling gas flow may be critical.

According to this invention, there is provided a method of making non-circular mineral fibers comprising discharging molten mineral material from non-circular orifices to produce streams of non-circular cross section, and cooling the streams to harden them into fibers having a non-circular cross-sectional shape similar to the shape of the orifices before the streams can assume a circular cross-section. A plurality of such orifices can be positioned in a wall of a container for a body of molten mineral material. The "container" can be, for example, a spinner or a feeder, and the "wall" can be a spinner peripheral wall or a bushing bottom wall.

According to this invention, there is provided a method of making mineral fibers comprising rotating a spinner containing molten mineral material having a liquidus greater than about 1200° F. (649° C.), the spinner having non-circular orifices positioned in its peripheral wall, to centrifuge the molten mineral material through the orifices as streams having non-circular cross-sections, and cooling the centrifuged streams to harden them into mineral fibers having a non-circular cross-sectional shape similar to the shape of the orifices before the streams can assume a circular cross-section.

In a specific embodiment of the invention, the mod ratio of the mineral fiber is within the range of from about 1.2 to about 100. In a more specific embodiment of the invention, the mod ratio of the mineral fiber is within the range of from about 1.2 to about 10.0.

According to this invention, there is also provided a non-circular mineral fiber produced according to the method of the invention. In a specific embodiment of the invention, an organic matrix is reinforced with mineral fibers produced according to the method of the invention.

In yet another embodiment of the invention, the mineral material centrifuged from the non-circular orifices is quenched to form a quadrilobal mineral fiber having a mod ratio within the range of from about 1.2 to about 5.0.

In another aspect of the invention, the cooling is sufficient to satisfy the equation $Z \leq 2$ where $$Z = (x_{75}\sigma_o/\mu_o r_{eo}) * (1/v_o) * 1/(MR_o - 1)$$

and where $x_{75}$ is the distance from the bushing at 75 percent attenuation (centimeters), $\mu_o$ is the initial viscosity (poise), $r_{eo}$ is the initial equivalent fiber radius (centimeters), $\sigma_o$ is the initial surface tension of the mineral material (dynes/cm), $v_o$ is the initial velocity (cm/sec) through the orifices and $MR_o$ is the initial mod ratio of the streams.

According to this invention, there is also provided apparatus for making non-circular mineral fibers comprising a rotatable spinner for containing molten mineral materials, the spinner having non-circular orifices positioned in the spinner peripheral wall, and the orifices having a mod ratio greater than about 1.2, and means for rotating the spinner to centrifuge the molten mineral material through the orifices to form non-circular fibers.

In another aspect of the invention, the mod ratio of the orifices is within the range of from about 1.2 to about 100.

In a more specific embodiment of the invention, the mod ratio of the orifices is within the range of from about 1.2 to about 10.0.

In yet another aspect of the invention, the aspect ratio of the orifices is within the range of from about 10 to about 100.

DESCRIPTION OF THE DRAWINGS

FIG. 1 is a schematic cross-sectional view in elevation of apparatus for forming non-circular glass fibers from a spinner according to the principles of the invention.

FIG. 2 is a schematic view in elevation of a spinner having crescent-shaped orifices according to the principles of the invention.

FIG. 3 is a schematic view in elevation of a spinner having vertically oriented slots as orifices.

FIG. 4 is a schematic view in elevation of a spinner having diagonally oriented slots as orifices.

FIG. 5 is a schematic view in elevation of a spinner having cross-shaped orifices.

FIG. 6 is a crescent-shaped non-circular cross-section of a glass fiber made from a spinner having a crescent-shaped orifice.

FIG. 7 illustrates a schematic cross-section of a ribbon fiber made from a spinner having slot-shaped orifices.

FIG. 8 illustrates a cross-shaped non-circular glass fiber made from a spinner having a cross-shaped orifice.

DESCRIPTION OF THE INVENTION

Figure 9:
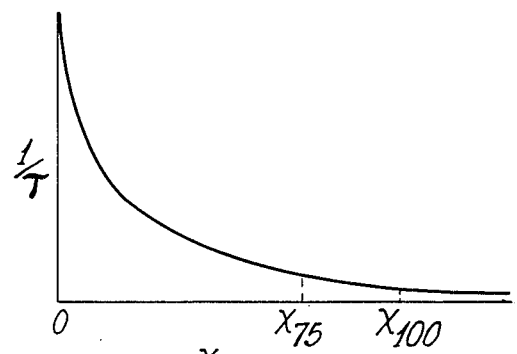
FIG. 9 is a graph of fiber characteristics as a function of distance from the spinner peripheral wall.

This invention will be described in terms of a glass fiber forming process and apparatus, and products made therefrom, although it is to be understood that the process is suitable for fibers of other mineral materials, particularly of such mineral materials as rock, slag and basalt.

As shown in FIG. 1, molten glass 10 is supplied to rotating spinner 12. The molten glass impinges on bottom wall 14 of the spinner and flows outwardly by centrifugal force to the spinner peripheral wall 16. The spinner peripheral wall contains non-circular orifices 18 through which molten streams of glass 20 emanate. The relative motion of the glass streams emanating from the spinner and the air surrounding the spinner results in a quenching of the molten streams into glass fibers 22. To some extent, the rate of quenching can be controlled by the rotational rate of the spinner. Other methods of controlling the quench rate include the use of external air sources, baffles or a heat source such as an annular burner, not shown. An annular blower, such as blower 24, can be positioned concentrically around the spinner to turn the fibers down for collection of the fibers, which can be by conventional means.

The spinner can be adapted with non-circular orifices of various shapes, such as slots, crosses, or other multilobal shapes, and in various configurations. As shown in FIG. 2, the spinner 12a can be adapted with crescent-shaped orifices 18a to produce glass fiber 22a having the cross-sectional shape similar to the shape of orifices 18a, shown in FIG. 5.

As shown in FIGS. 3 and 4, the spinners 12b and 12c can be adapted with slot-shaped orifices 18b and 18c, respectively which can be either vertical, as shown in FIG. 3, or on a diagonal, as shown in FIG. 4. The aspect ratio of slot-shaped orifices is preferably within the range of from about 10 to about 100, where the aspect ratio is defined as the cross-sectional length compared to the cross-sectional width. The resulting fiber is a ribbon fiber, such as ribbon fiber 22b, similar in shape to the shape of orifices 18b, shown in FIG. 7. The ribbon fibers can be broken to produce a flake glass product. Ribbon fibers with an aspect ratio of about 40 have been made from slot-shaped orifices. The aspect ratio of the fibers is preferably within the range of from about 1.2 to about 100.

As shown in FIG. 5, cross-shaped orifices 18d can be employed in spinner 12d. The resulting fiber can be cross-shaped fiber 22c, illustrated in FIG. 8, which has a shape similar to the shape of orifices 18d.

In order to quantitatively describe the formation of non-circular glass fibers, it is useful to consider a time constant $\tau$ for the decay of the shape from non-circular cross-section back to circular cross-section. As soon as a molten glass stream of non-circular cross-section flows from a non-circular orifice, surface tension forces act on the stream to change it into a circular cross-section. Opposing these forces are viscous forces, which tend to resist changes in the shape of the stream. The viscous forces increase extremely rapidly because of cooling as the molten glass in the stream moves away from the spinner peripheral wall. In order to successfully make non-circular fibers, the viscous forces (i.e., the viscosity) must be increased quickly enough to retard the effect of the surface tension forces.

The time constant is believed to be the function of the viscosity of the glass, the equivalent radius of the glass stream, and the surface tension, according to the equation: $\tau = \mu r / \sigma$. This equation can be transformed with a velocity factor to enable integration over distance along the fiber, i.e., the distance away from the spinner peripheral wall, instead of with respect to time. In operation, when only a few time constants pass prior to the hardening or greatly increased viscosity of the glass, the fiber still maintains its non-circular shape. When many time constants pass, however, prior to reaching high viscosity, the glass stream returns to a circular cross-section and produces a circular fiber. When the inverse of the time constant is integrated over the distance to 100% attenuation, the ratio of the time-to-become-viscous to the time-to-revert-to-a-circular-cross-section is obtained. This ratio, difficult to measure exactly, can be estimated by the ratio Z, as given by the following equation:

$$Z = (x_{75}\sigma_o/\mu_o r_{eo}) * (1/v_o) * 1/(MR_o - 1)$$

where:

$x_{75}$ is the distance from the spinner peripheral wall at 75 percent attenuation (cm);

$\mu_o$ is the initial viscosity (poise);

$r_{eo}$ is the initial equivalent fiber radius (cm);

$\sigma_o$ is the initial surface tension of the mineral material (dynes/cm);

$v_o$ is the initial velocity (cm/sec) through the orifices; and $MR_o$ is the initial mod ratio of said streams.

The factor $1/(MR_o - 1)$ is a factor indicative of the mod ratio of the hole or orifice, and hence the initial mod ratio of the glass stream. It has been found that this equation correlates very well with theoretical considerations as shown in FIG. 9 where the curve represents the reciprocal of the time constant as a function of distance from the spinner peripheral wall. The integral is the area underneath the curve, and the smaller the area underneath the curve, the smaller the number of time contants experienced by the stream before hardening and therefore the greater the mod ratio. It has been found that in order for the final fiber to be non-circular, Z should be less than or equal to 2, and preferably less than or equal to 1.

The inertia forces or glass pressure at the orifices can affect the extent to which non-circular fibers can be formed. The pressure can be produced by any means, such as the hydrostatic head of the molten glass and the spinner diameter and rotation rate. For the production of glass fibers from the rotary process the hydrostatic pressure is preferably within a range of from about 0.5 psi (3480 Pascals) to about 250 psi (1,720,000 Pascals).

It has been found that shallower or less deep orifices enable an improvement or increase in the mod ratio of the non-circular fibers. Preferably, the depth of the orifices is within the range of from about 0.002 in. (0.05 mm) to about 0.5 in. (12.8 mm).

Figure 10:
FIG. 10 is a schematic cross-sectional view of a resin matrix reinforced with non-circular fibers.
Figure 11:
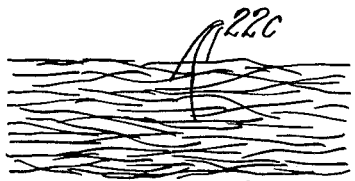
FIG. 11 is a schematic cross-sectional view of an insulation product made from non-circular fibers.

As shown in FIG. 10 quadrilobal fibers 52d can be made and positioned in a resin matrix, such as plastic resin 26, for reinforcement. Non-circular mineral fibers of this invention preferably have the characteristic that when used to reinforce an organic matrix the fibers provide increased transverse tensile strength, within the range of from about 25 percent increase to about 200 percent increase as compared with the equivalent circular fibers, when measured by ASTM Standard D 3039. The non-circular mineral fibers also preferably provide increased NOL shear strength, as measured by ASTM Standard D 2344, within the range of from about 10 percent increase to about 100 percent increase as compared to equivalent circular fibers.

As shown in FIG. 8, the non-circular fibers of the invention can be made into an insulation product, such as building insulation. Preferably, the insulation product will have a binder. Any suitable binder, such as a phenol formaldehyde urea binder, will be sufficient.

Some non-circular fibers will have physical properties different from those of circular fibers, thereby affecting properties of insulation products. For example, a fiber with an I-beam cross-section would be stiffer than a circular fiber. Thus, an insulation product of I-beam fibers might exhibit improved recovery characteristics. The inherent increased surface area of non-circular fibers over circular fibers would likely result in insulation products of lower thermal conductivities. Non-circular fibers of the invention could be employed in insulation products to provide lower thermal conductivities, while potentially using less mineral material. These products could therefore be lighter in weight and lower in cost than insulation products made from circular fibers.

EXAMPLE I

Ribbon glass fibers were made from a 15 inch spinner having 1440 vertical slot-shaped orifices under the following conditions:
Slot-shaped Orifice size (rectangular):
  width: 15 mil (0.381 mm)
  length: 250 mil (6.35 mm)
Glass temperature = 2000 ± 50° F. (1093 ± 28° C.)
Glass type: AF Standard silica wool glass
Glass pull rate: 1150 ± 50 lbs/hr (522 ± 23 kg/hr)
Spinner RPM: 2400
Internal burner gas flow: 390 scfh (184 liters/min)
Blower flow: 300 cfm (8,496 liters/min)
Blower pressure: 60 psi (4.22 kg/cm$^2$)

The resulting ribbon fiber had the following characteristics:
Width: 340 to 660 HT (85 to 165 microns)
Thickness: 12 to 50 HT (3 to 13 microns)

The ribbon fiber was capable of being broken into flake glass particles.

EXAMPLE II

Crescent-shaped glass fibers were made from a 15 inch spinner having 15,000 C-shaped orifices under the following conditions:
C-shaped Orifice size:
  overall diameter of orifice: 50 mil (1.27 mm)
  thickness of slot: 10 mil (0.25 mm)
  arc length of slot: 270°
Glass temperature = 1900 ± 50° F. (1038 ± 28° C.)
Glass type: AF Standard silica wool glass
Glass pull rate: 1150 ± 50 lbs/hr (522 ± 23 kg/hr)
Spinner RPM: 2400
Internal burner gas flow: 390 scfh (184 liters/min)
Blower flow: 300 cfm (8,496 liters/min)
Blower pressure: 60 psi (4.22 kg/cm$^2$)

The resulting crescent-shaped fibers had the following characteristics:
Average effective diameter: 27 HT (6.9 microns)
Effective diameter range: 4–100 HT (1–25 microns)
Average height (top to bottom): 35 HT (8.6 microns)
Average thickness: 24 HT (5.9 microns)

It will be evident from the foregoing that various modifications can be made to this invention. Such, however, are considered as being within the scope of the invention.

INDUSTRIAL APPLICABILITY

This invention will be found to be useful in the production of glass fibers for such uses as thermal and acoustical insulation products, and reinforcements for resin matrices.

We claim:

1. The method of making mineral fibers having a mod ratio greater than about 1.2 comprising rotating a spinner containing molten mineral material having a liquidus greater than about 1200° F. (649° C.), said spinner having non-circular orifices positioned in its peripheral wall, to centrifuge said molten mineral material through said orifices as molten streams having non-circular cross-sections, the mineral material in said streams having a low enough initial viscosity that said streams would assume circular cross-sections in the absence of quenching, and quenching the centrifuged streams to harden them into mineral fibers having a non-circular cross-sectional shape similar to the shape of said orifices before the streams can assume a circular cross-section.

2. The method of claim 1 in which the mod ratio of the mineral fiber is within the range of from about 1.2 to about 100.

3. The method of claim 1 in which the mod ratio of the mineral fiber is within the range of from about 1.2 to about 10.0.

4. The method of making mineral fibers having a mod ratio greater than about 1.2 comprising rotating a spinner containing molten mineral material having a liquidus greater than about 1200° F. (649° C.), said spinner having non-circular orifices, to centrifuge said molten mineral material through said orifices, the mineral material in said streams having a low enough initial viscosity that said streams would assume circular cross-sections in the absence of quenching, and quenching the centrifuged mineral materials to form a mineral fiber having a mod ratio within the range of from about 1.2 to about 5.0.

5. The method of making non-circular mineral fibers having a mod ratio greater than about 1.2 comprising rotating a spinner containing molten mineral material having a liquidus greater than about 1200° F. (649° C.), said spinner having non-circular orifices positioned in its peripheral wall, to centrifuge said molten mineral material through said orifices as molten streams having non-circular cross-sections, the mineral material in said streams having a low enough initial viscosity that said streams would assume circular cross-sections in the absence of quenching, and quenching said streams to harden them into mineral fibers having a non-circular cross-sectional shape similar to the shape of said orifices before said streams can assume a circular cross-section, said quenching step being sufficient to satisfy the equation: $Z \leq 2$ where:

$$Z = (x_{75}\sigma_o/\mu_o r_{eo})*(1/v_o)*1/(MR_o - 1)$$

and where:
- $x_{75}$ is the distance from the bushing at 75 percent attenuation (cm);
- $\mu_o$ is the initial viscosity (poise);
- $r_{eo}$ is the initial equivalent fiber radius (cm);
- $\sigma_o$ is the initial surface tension of the mineral material (dynes/cm);
- $v_o$ is the initial viscosity (cm/sec) through said orifices; and
- $MR_o$ is the initial mod ratio of said streams.

6. The apparatus for making non-circular mineral fibers comprising a rotatable spinner for containing molten mineral material having a liquidus greater than about 1200° F. (649° C.), said spinner having non-circular orifices positioned in the spinner peripheral wall, and said orifices having a mod ratio greater than about 1.2, and means for rotating said spinner to centrifuge said molten mineral material through the orifices to form non-circular fibers.

7. The apparatus of claim 6 in which the mod ratio of the orifices is within the range of from about 1.2 to about 100.

8. The apparatus of claim 6 in which the mod ratio of the orifices is within the range of from about 1.2 to about 10.0.

9. The apparatus of claim 6 in which the aspect ratio of said orifices is within the range of from about 10 to about 100.

* * * * *